Figures 1, 2, 3:
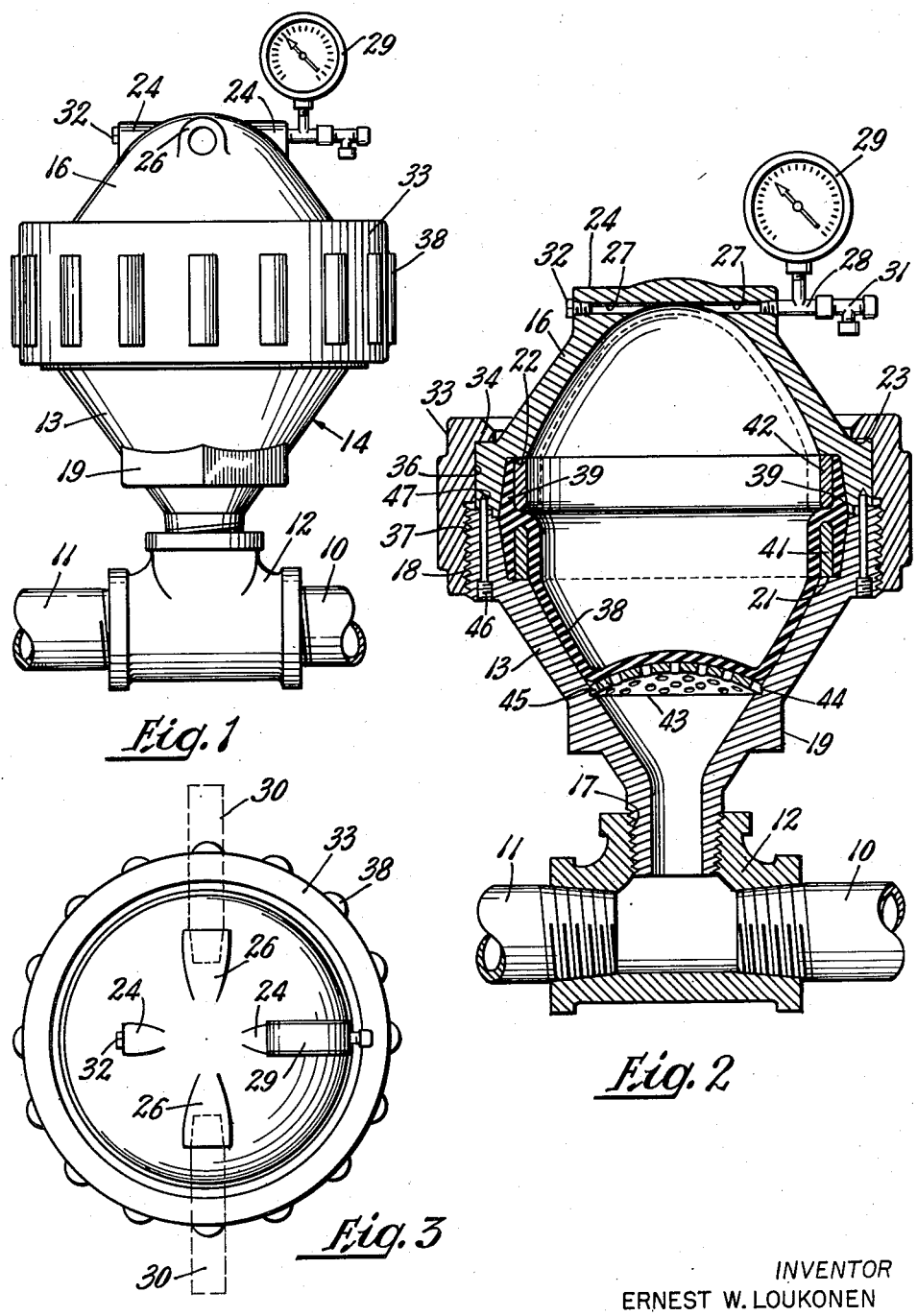

Aug. 7, 1951   E. W. LOUKONEN   2,563,257
PULSATION ABSORBER
Filed Sept. 16, 1946

INVENTOR
ERNEST W. LOUKONEN
BY Harold W. Mattingly
ATTORNEY

Patented Aug. 7, 1951

2,563,257

UNITED STATES PATENT OFFICE 2,563,257

PULSATION ABSORBER

Ernest W. Loukonen, Long Beach, Calif.

Application September 16, 1946, Serial No. 697,319

5 Claims. (Cl. 138—30)

My invention relates to a pulsation absorber, and has particular reference to a device adapted to absorb or smooth out the fluctuations in pressure in a fluid system through which fluid is pumped by a reciprocating pump mechanism.

In many hydraulic systems, a pump employing reciprocating pistons is used for the purpose of pumping fluid through the system, the reciprocating of the pump pistons resulting in a flow of fluid through the system in a series of pulsations of relatively high pressure alternating with periods of low pressure resulting from the action on the fluid by the reciprocating pistons of the pump. In many instances, particularly those in which a relatively high pressure is required, or a relatively large volume of fluid is displaced upon each stroke of the pump pistons, the resulting pulsations in the system cause undesired effects such as creating vibrations in the system resulting in damage to pipes, hoses, or other conduits employed to conduct the hydraulic fluid, and imposing undesirable and unnecessary strains upon various pieces of apparatus employed in the system.

One system of this character is the hydraulic system employed for circulating fluid through a string of drill pipe during the drilling of deep wells in which the circulating fluid is passed down through the string of drill pipe for the purpose of washing out and removing the cuttings made by the bit. In such systems it is the common practice to interconnect the string of drill pipe with the circulation pump by means of either flexible hoses or jointed pipes through which the fluid is passed from the pump to the drill string proper. In many instances, the pressures which are required to be employed for the circulating fluid are extremely high, and the pulsations of the pump are transmitted through the flexible pipe or hose to the upper end of the drill string, resulting in an undesired and dangerous vibration of the upper end of the drill string, the traveling block and cables of the hoisting system employed to suspend the drill string during the drilling operations.

Pulsation absorbers have heretofore been used that are complicated in construction and require periodic bleeding. When oil becomes mixed with the air in such absorbers an explosive mixture is formed which is dangerous, particularly on bleeding. Further, bleeding is often accomplished by unscrewing a plug which forms a dangerous projectile where high gas pressures are present in such absorbers.

It is therefore an object of my invention to provide a device for absorbing the pulsations resulting from the reciprocating of the fluid pump pistons to thereby cause a substantially uniform flow of fluid from the pump to the hydraulic system supplied by the pump.

Another object of my invention is to provide a pulsation absorbing device which is simple in its construction and inexpensive to manufacture, and which does not require bleeding.

It is also an object of my invention to provide a pulsation absorber which comprises a chamber divided into two parts by means of a flexible diaphragm, one part being communicated with the discharge of the reciprocating pump and the other part being filled with gas or air at a pressure substantially greater than atmospheric.

It is an additional object of my invention to provide a device of the character set forth in the preceding paragraph in which the connection means for attachment to the discharge line of the pump includes a portion of larger diameter to effectively reduce the velocity of flow of fluid into and out of the chamber.

Another object of my invention is to provide an improved diaphragm construction for a pulsation absorber wherein the diaphragm is not under a stretch or tension load.

A still further object of my invention is to provide an improved diaphragm for a pulsation absorber that also acts as a seal for the mating surfaces of the two parts forming a chamber in which the diaphragm acts.

Still a further object of the invention is to provide an improved rest plate for limiting the movement of the diaphragm under the influence of a compressible medium.

Other objects and advantages of my invention will be apparent from a study of the following specifications, read in connection with the accompanying drawings, wherein Fig. 1 is a side elevational view illustrating the form and appearance of the preferred embodiment of my invention;

Fig. 2 is a longitudinal sectional view taken through the device shown in Fig. 1; and Fig. 3 is a top view of the pulsation absorber of Figs. 1 and 2.

Referring to the drawings, the pulsation absorber of my invention may be connected to the output line of the pumps previously mentioned; for example, mud pumps as used in the oil industry. This output line may include two pipe sections 10 and 11 threaded into a T connection 12, to which is connected the pulsation absorber of my invention indicated generally by the reference numeral 14.

The main portion of the pulsation absorber housing may be formed by two shell members, a lower, generally funnel-shaped member 13, and an upper, generally dome-shaped member 16. The lower, funnel-shaped member 13 may have its smaller end formed with pipe threads 17 for engagement with the T connection 12, and may have machine threads 18 formed on the outer surface of the larger end. The funnel-shaped member 13 is preferably formed of cast metal, and during this casting operation may have integrally formed thereon an hexagonal portion 19 for engagement by a wrench for threading the member into the T connection 12. The larger end of the funnel-shaped member 13 may be interiorly relieved to form a recess having an annular shoulder 21.

The upper housing member 16 has its interior surface generally rounded in substantially parabolic dome-shaped contour and has its open end interiorly relieved to form an annular recess having a shoulder 22 similar in size and extent to annular shoulder 21. The open end of the dome 16 is also formed with an external annular shoulder 23. The dome member 16 is preferably formed by casting, and during this operation four projecting bosses may be formed thereon including two smaller bosses 24 and two larger bosses 26. The smaller bosses 24 may be drilled as at 27 to communicate with the interior of the housing 16. A guage fitting 28 may be threaded into one of the bosses 24, and a pressure guage 29 secured thereto. Also a gas valve unit 31 may be secured to the guage fitting 28 or to the other boss 24, as desired. If either passage 27 is not utilized in one fashion or another, it may be closed as by a plug 32. The larger bosses 26 are not drilled through to the interior of the housing 16, but are drilled a short distance and then tapped for receiving handles 30 shown in broken outline in Fig. 3. These handles may be of sufficient length to form a convenient hand grasp for lifting and moving about the dome member 16 or the entire pulsation absorber when it is assembled. The dome member 16 and the funnel-shaped member 13 define a pulsation chamber 25.

The two housing members 13 and 16 may be secured together particularly in accordance with my invention by means of a locking ring 33 having an internal flange 34 on one end to contact the external shoulder 23 of the housing member 16. A cylindrical portion 36 of the locking ring 33 closely fits about the outer periphery of the dome member 16, and a further enlarged portion is internally threaded as at 37 to engage the threads 18 on the lower-funnel-shaped member 13. The locking ring 33 is also preferably cast, and during the casting operation a plurality of spaced lugs 38 may be formed on the external surface thereof for engagement by a wrench or other device for threading the ring onto the funnel-shaped housing member 13.

I provide the pulsation absorber with a flexible diaphragm 38 made particularly in accordance with my invention and which may have a general bag shape such as a hemispherical shape with the edges thereof formed with a double flange 39. The diaphragm 38 is preferably molded, and I have found that some of the synthetic rubbers such as neoprene are quite satisfactory. The diaphragm is positioned within the housing members 13 and 16 by means of two rings 41 and 42 placed inside either edge of the double flange 39 of the diaphragm 38. Accordingly the ring 41 may rest upon the shoulder 21 and the ring 42 may rest upon the shoulder 22 when the entire pulsation absorber is assembled. The effect of the rings 41 and 42 is to align the double flange 39 so that it is generally cylindrical. Further, it will be noted that the edges of the rings 41 and 42, which may be made of steel, are rounded where they contact the diaphragm 38 in the region of the double flange 39.

In order that pulsations in the fluid delivery pipes 10 and 11 may be absorbed, a gas under pressure, such as nitrogen, may be inserted through the valve 31 to fill the entire interior of the housings 13 and 16. This gas pressure urges the diaphragm 38 downwardly, and to arrest its movement in a downward direction I provide a perforated plate 43. This plate preferably rests in an annular groove 44 formed in the interior of the funnel-shaped housing member 13, and for the greatest strength I prefer to cup or dish the perforated plate 43 so that when it receives the forces due to the gaseous pressure in the housing, it will tend to expand against the housing 13, which housing being relatively inelastic, will prevent a further deformation and the entire dished plate 43 will act as an arch. The dished structure of the plate 43 also provides a greater area for perforations therethrough than would be the case with a flat plate. I design the diaphragm 38 of my invention of sufficient size with respect to the position of the perforated plate 43 so that when the diaphragm is fully extended, as shown in Fig. 2, it is not in a stretched or otherwise stressed condition. Similarly, the size of the interior of the dome member 16 is so designed with respect to the portion of the lower housing 13 above the plate 43 as to be approximately the same size, so that when abnormal liquid pressures force the diaphragm into the upper dome member 16 it will not be stressed even though nearly all the air should be compressed or released from the dome 16 through leakage, improper servicing, etc. Accordingly, therefore, the diaphragm 38 is never stressed, since during operation the gas pressure will equal the liquid pressure, and when all liquid is excluded the diaphragm will rest upon the plate 43 as shown in Fig. 2. This lack of stress materially lengthens the life of the diaphragm 38 in operation. Alternatively, or in combination with the perforations of plate 43, the edges may be milled as at 45 to permit liquid flow.

In assembling the pulsation absorber 14 of my invention, the lower housing member 13 may be positioned in any suitable manner, and the perforated plate 43 placed therein. The plate may thereafter be tapped with a hammer or otherwise deformed to have a friction engagement with the notch 44 in which it is seated. The rings 41 and 42 may then be positioned against the double flange 39 of the diaphragm 38, and the assembly of the diaphragms 38 and the rings 41 and 42 may then be placed within the lower housing 13 and the assembly may come to rest upon the shoulder 21 in the housing member 13. Dowel pins 46 may next be threaded in the lower housing member 13 so that they project upwardly from the upper surface of the housing member 13. The dome 16 may next be placed upon the assembly of the diaphragm 38 in the lower housing member 13, and may be handled by grasping the pipe handles 30 as shown in Fig. 3. The dome member 16 may be positioned over the diaphragm assembly until the drilled holes 47 in the lower surface of the housing receive the projecting dowel pins 46. The locking ring 33 is next positioned over the dome shaped member 16 and threaded into engagement with the lower member 13 until the two housing members 13 and 16 are in tight contact with each other. This construction is such, also, that the contact is sufficient even though the locking ring 33 is threaded by hand. Thereafter the guage fitting 28, the guage 29 and the gas valve 31 are next assembled to the dome member 16 and the unit is then complete.

In operation the pulsation absorber 14 may be secured to any suitable pump outlet as indicated by the pipes 10 and 11 in Fig. 1, and the unit may then be charged with a gas, preferably an inert gas such as nitrogen, to a pressure commensurate with the pulsation pressures to be absorbed. For example, if the pulsations are on the order of 5,000 p. s. i., the absorber may be charged with nitrogen to a pressure from 3,000 to 4,000 p. s. i. The desired pressure and the peaks of pressure occurring during operation may be observed upon the pressure indicator 29. When pulsations of fluid pressure occur in the lines 10 and 11, the fluid will travel through the lower portion of the funnel-shaped member 13 and into the diverging part thereof, where its velocity will be materially reduced because of the greater volume through which the pulsation of fluid will move. If the fluid pulsation is of sufficient pressure, the fluid will pass through the perforated plate 43 or through the notches 45 in the edge thereof, urging the diaphragm 38 upwardly against the compression of the gas on the other side of the diaphragm. As the diaphragm goes upwardly, the gas pressure thereupon will be increased, gradually reducing the velocity of the upward surge of the liquid pulsation. An equilibrium point will be reached where the pressures of the liquid and gas are equal. The ability of the pulsation absorber 14 to smooth out or alleviate these high pressure peaks from the line prevents ruptures of liquid conduits which would otherwise occur due to the hammer effect which may be magnified in any system dependent upon the connection thereto.

During the operation of the pulsation absorber, the diaphragm will be flexed upwardly and downwardly as mentioned, but will be held securely in position at all times by the rings 41 and 42 holding the double flange 39 of the diaphragm in the respective recesses in the housing members 13 and 16. Inasmuch as no stretch is present in the diaphragm because of its shape, these rings perform this function without being subject to stress. The pressures of the liquid and gas acting on the double flange 39 force it outwardly, automatically sealing the joint between the housing halves. Thus the double flange 39 acts at all times as a seal for the joint between the housing members 13 and 16, the fluid pressures inside of the housing compressing the double flange 39 against the joint.

The pulsation absorber 14 is at present designed for operation pressures on the order of 5,000 p. s. i., and accordingly is usually tested at 12,000 p. s. i. The material accordingly should be extremely rugged and shock-resistant. The housing member 13, the dome member 16 and the locking ring 33 accordingly are preferably made from cast steel, either carbon steel or alloy steel, and these castings are preferably annealed before machining. Various other materials may be used, however, according to the operating pressures on which the units may be used. The mating surfaces of the housing members 13 and 16 should be accurately finished to insure a good fit. The pulsation absorber may be of any desired size, and I have successfully used pulsation absorbers having an overall diameter of about twelve inches and an overall height of about fourteen inches.

While I have described my invention with respect to a single preferred embodiment thereof, it is obvious that various modifications may be made therein without departing from the true spirit and scope of my invention. For example, different shapes of housing members could be used, and different connections could be used without departing from the scope of the invention. Accordingly I do not care to limit myself to the specific embodiment, nor otherwise, except by the terms of the following claims.

I claim:

1. A pulsation absorber comprising a funnel-shaped housing member having pipe threads on its smaller end and machine threads on the outside of its larger end and having an annular groove formed on the interior adjacent the small end and having an annular recess formed at the interior of its larger end, a dome-shaped housing member adapted to be joined with the large end of the funnel-shaped housing member and having an interior annular recess at its open end substantially of the same size as the recess on the funnel-shaped member, a bag-shaped diaphragm disposed within the two housing members and having a double flanged edge which automatically seals the diaphragm against loss of either gas or liquid, on either side of same, a ring contacting each portion of the double flanged edge of the diaphragm for holding the flange within the recesses of the two housing members, means defining a gas passage through said dome-shaped housing member and communicating with the interior thereof, a gas valve communicating with the passage in the dome-shaped housing member, a dished plate disposed on the annular groove in the funnel-shaped housing member, and a threaded locking ring extending about said dome-shaped housing member and engaging the threads on the funnel-shaped housing member to secure the two housing members together.

2. A pulsation absorber comprising a funnel-shaped housing member having an annular groove in the interior thereof, a dome-shaped housing member adapted to be joined to the large end of the funnel-shaped housing member, a bag-shaped diaphragm secured between the two housing members, and a perforated arcuate plate resting within the annular groove of the funnel-shaped housing member and dished away from the small end of the funnel-shaped member.

3. A pulsation absorber comprising a housing member having a funnel-shaped interior, a dome member having a substantially parabolic interior joined to the large end of the housing member to define therewith a chamber of diminishing cross section as it approaches the ends, a flexible diaphragm disposed across the chamber and secured at the junction of said members to divide the chamber into two portions, said diaphragm having an area such as to permit its contacting the entire inner surface of either portion of said chamber, and a perforated plate disposed across the small end of said funnel-shaped member dished inwardly of said chamber.

4. A pulsation absorber comprising a housing defining a fluid chamber, said housing including a housing member and a dome member joined together, a diaphragm extending across said chamber and having a double flanged edge, a recess in each of said members at the line of junction of said members, said recesses each having a depth in excess of the thickness of said flange, and a ring in each of said members for engagement with said flanges, said rings each having a thickness equal to the excess depth of said recesses to provide a filling for said recesses and to present with the interior surface of said members a smooth continuous surface for contact with said diaphragm.

5. A pulsation absorber comprising a two-piece housing joined together to define a fluid chamber, said housing comprising a pair of complementary members, each open in the plane of its largest diameter, a recess formed at the open edge of each of said housing members and extending circumferentially about the interior of said members, a diaphragm extending across said chamber at the junction of said housing members and having a double flanged edge, each of the flanges tapering from a minimum thickness at the edge of the flange to a maximum thickness at the base of the flange, the recesses in said housing members having a depth along the housing member equal to the depth of the flanges between their edges and bases and said recesses having a radial depth in excess of the thickness of said flanges, and a ring in each of said members for engagement with said flanges, said rings each having a thickness equal to the excess radial depth of said recesses to provide a filling for said recesses and to present with the interior surface of said members a smooth continuous surface for contact with said diaphragm.

ERNEST W. LOUKONEN.

REFERENCES CITED

The following references are of record in the file of this patent:

UNITED STATES PATENTS

| Number | Name | Date |
| --- | --- | --- |
| 2,324,701 | Herman | July 20, 1943 |
| 2,339,876 | Phillips | Mar. 7, 1944 |
| 2,343,320 | Parker | Mar. 7, 1944 |
| 2,387,598 | Mercier | Oct. 23, 1945 |
| 2,389,791 | Lippincott | Nov. 27, 1945 |
| 2,469,171 | Mercier et al. | May 3, 1949 |

FOREIGN PATENTS

| Number | Country | Date |
| --- | --- | --- |
| 732,794 | France | Sept. 26, 1932 |